Aug. 9, 1949.　　　　　O. T. PIEPER　　　　　2,478,779
SPRAY DRYING APPARATUS
Filed March 7, 1945　　　　　　　　　　　　　2 Sheets-Sheet 2
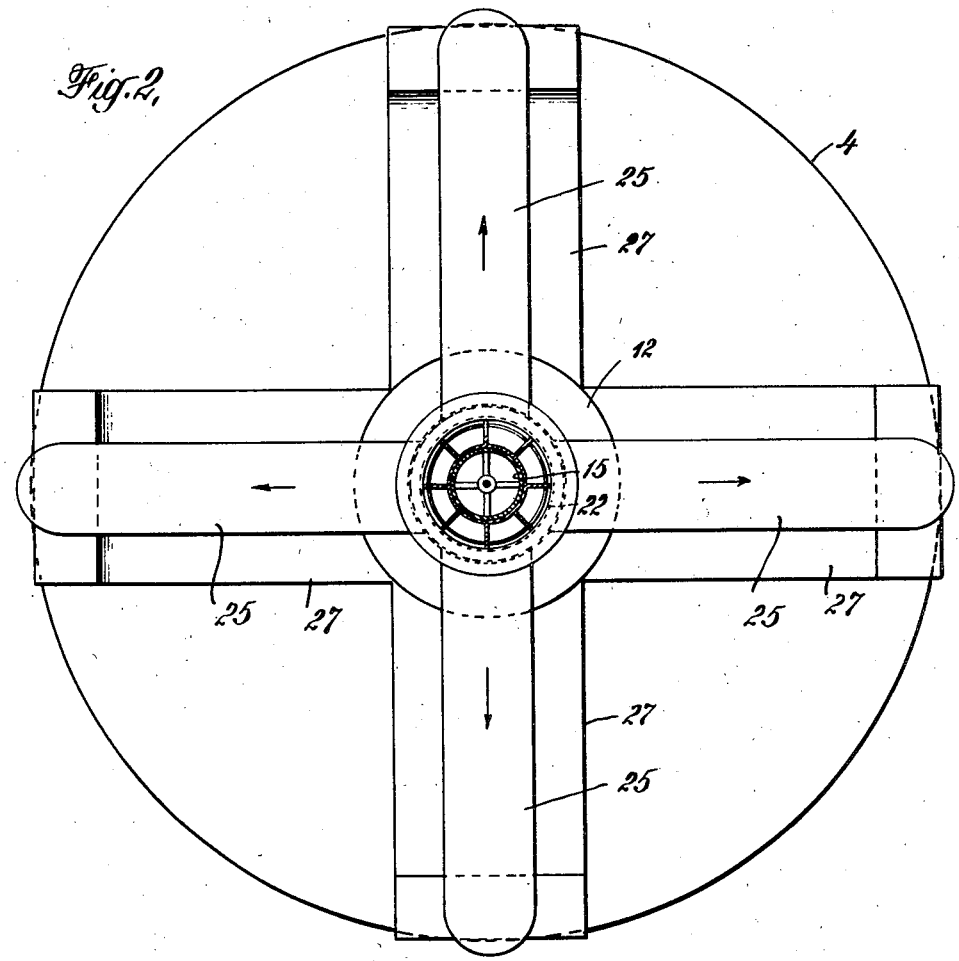
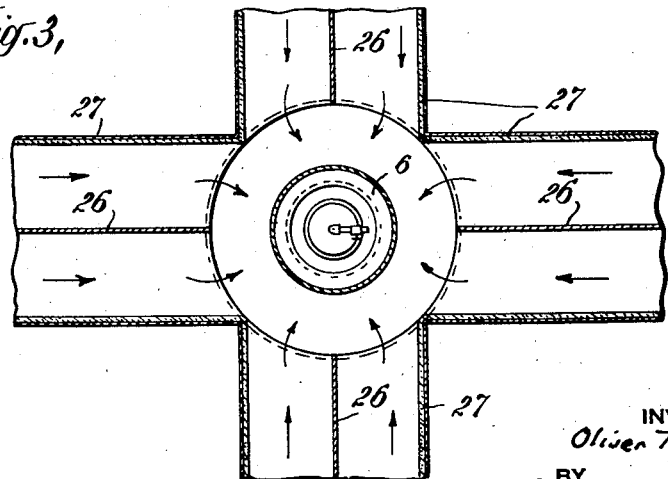
INVENTOR
Oliver T. Pieper
BY
ATTORNEYS Patented Aug. 9, 1949

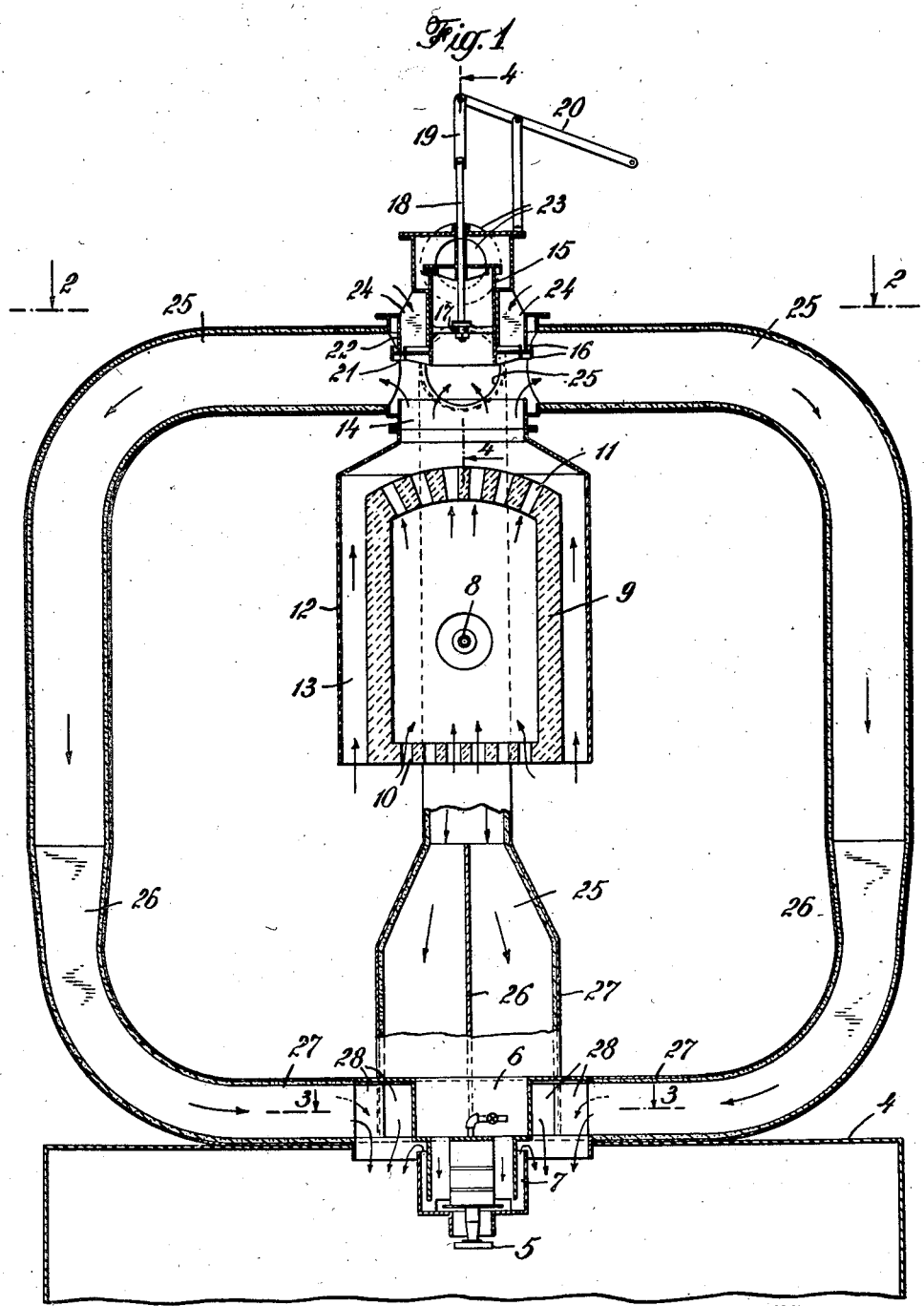

2,478,779

UNITED STATES PATENT OFFICE 2,478,779

SPRAY DRYING APPARATUS

Oliver T. Pieper, Wilmington, Del., assignor to American Dyewood Company, New York, N. Y., a corporation of Pennsylvania Application March 7, 1945, Serial No. 581,477

3 Claims. (Cl. 159—4)

This invention relates to spray drying and particularly to improvements in the method of separating material in a dry condition from liquids containing such material and to apparatus therefor.

Spray drying, in which liquid is distributed into a current of heated gas such for example as combustion products, with or without added air, for the purpose of rapidly evaporating the liquid and obtaining a dry product, has been practised for many years with various types of apparatus. The most modern and effective apparatus utilizes a whirling disc or "wheel" to which the liquid is fed and from which it is distributed by centrifugal force applied by rapid rotation of the wheel into an atmosphere to which heated gases are continuously delivered. One of the problems which has not been solved satisfactorily heretofore is that of securing uniform distribution of the heated gases to the chamber in which the drying is effected. Lack of uniform distribution of the gases results in failure to evaporate all of the liquid in portions of the material, and deposits of partially evaporated material are built up on the walls of the evaporation chamber. This in turn necessitates frequent stoppage of the apparatus for cleaning and additional expense due to cleaning and to the loss of material which is not recovered in the desired form. These and other disadvantages of the known types of apparatus have limited the application of spray drying, which in many cases has proved to be uneconomical.

It is the object of the present invention to provide an improved method of spray drying in which uniformity of distribution of the heated gases is maintained and the disadvantages mentioned are avoided.

Another object of the invention is the provision of an improved apparatus embodying novel means for securing uniform distribution of the heated gases in the evaporation chamber to effect rapid and complete evaporation of all of the liquid delivered to the chamber.

A further object of the invention is the provision of improved means for generating and distributing heated gases, the distribution being symmetrical with respect to the axis of distribution of the liquid so that uniform contact of the heated gases with the liquid is attained.

Other objects and advantages of the invention will be apparent as it is better understood by reference to the following specification and the accompanying drawing, in which Fig. 1 is a diagrammatic representation of a portion of a spray chamber with the apparatus for generating and distributing heated gases arranged symmetrically with reference to the axis of distribution of the liquid;

Fig. 2 is a section on the line 2—2 of Fig. 1; and

Fig. 3 is a section on the line 3—3 of Fig. 1.

Referring to the drawing, 4 indicates the upper portion of a spray chamber of any suitable construction and preferably of generally cylindrical form, into which liquid is delivered by a wheel 5 in a uniform manner. The details of construction of the wheel form no part of the present invention, being described in my copending application Ser. No. 581,476, filed March 7, 1945. The wheel is disposed in a well 6 in the top of the chamber 4 which communicates through passages 7 with the interior of the chamber so that cool air may circulate about the driving mechanism for the wheel (not shown) and thereafter enter the chamber in such a manner as to protect the mechanism from heat supplied through the heated gases which are introduced to effect evaporation.

In order to accomplish the purpose of the invention, the source of heated gases must be disposed axially with respect to the wheel 5 either above or below the chamber 4. In the drawing, the source of heated gases is shown above the chamber, although the alternative position is equally effective. The axial arrangement is essential in order that distribution of the heated gases may be effected through a plurality of symmetrically arranged flues which deliver the heated gases at symmetrically disposed inlets to the chamber 4.

The heated gases are produced by combustion of any suitable fuel, preferably oil or gas, introduced through a burner 8 to a combustion chamber surrounded by a shell 9 of heat resistant brick or other suitable material. Air for combustion enters through openings 10 at the bottom of the chamber, and the heated combustion gases escape through openings 11 at the top thereof. The combustion chamber or furnace is preferably surrounded by a shell 12 affording a circumferential flue 13 through which additional air may circulate to mix with the hot combustion gases to reduce the temperature thereof. By regulation of the burner 8, the proper volume of heated gases at the required temperature can be delivered through the throat 14.

In initiating the operation, it is necessary to discharge the mixture of combustion products and air to the atmosphere until the proper temperature has been attained. For that purpose, a cylindrical valve 15 carrying a circumferential flange 16 is supported for movement above the throat 14 and is adapted to be actuated through a bar 17 having a stem 18 and link 19 which may be connected to an operating lever 20 or other suitable mechanism to facilitate operation. The flange 16 has recesses 21 on opposite sides thereof adapted to engage the throat 14 or a depending flange 22, depending upon its position. When the valve 15 is lowered, the gases from the furnace pass upwardly therethrough and escape to a chimney 23. In this position, the valve permits cold air to enter through passages 24 to the symmetrically arranged flues 25 which deliver the air to the chamber 4. When the valve 15 is raised to the position indicated in the drawing, the upper end thereof is closed by a plate 25 so that gases from the furnace can no longer escape to the chimney 23. At the same time, the cold air inlets 24 are closed. The heated gases from the furnace are then diverted to the flues 25.

The inlets to the flues 25 are of reduced diameter due to the position of the flange 16 so that the mixture of combustion gases and air passes through throats of reduced size and expands into the flues 25. This arrangement ensures thorough mixture of the auxiliary air with the combustion products and a uniform composition of the heated gaseous mixture flowing through the flues 25. The symmetrical arrangement of the flues 25 ensures the distribution of precisely equal parts of the heated gases through the respective flues. Although four are shown in the drawing, any number of flues may be used, provided they are symmetrically disposed with respect to the axis of the furnace and of the wheel 5 in the spray chamber 4.

To ensure further subdivision of the heated gases, each of the flues 25 may be provided with a partition 26 extending through an enlarged section 27 at the lower end of each of the flues. The partitions divide the heated gases flowing through the flues 25 into equal parts. The enlarged sections 27 terminate in inlets 28 symmetrically arranged about the well 6. Thus, aliquot parts of the heated gases are delivered uniformly and symmetrically into the chamber 4 about the wheel 5 and consequently to the liquid delivered by the wheel in a uniform manner laterally and in all directions about the axis. By thus ensuring the uniform and symmetrical delivery of the heated gases, the disadvantages inherent in spray drying apparatus as heretofore known are avoided. It is possible to secure rapid and complete drying of the solid particles and to avoid the accumulation of partially dried materials on the walls of the spray chamber.

Various changes may be made in the structure and arrangement of the parts, it being essential, however, as hereinbefore indicated, that the source of heated gases be disposed axially with respect to the distribution wheel and that the flues carrying the heated gases be symmetrically arranged about the axis in order to avoid inequalities in distribution of the heated gases.

I claim:

1. In an apparatus for delivering heated gases for contact with a liquid spray, the combination of a spray distributor, a combustion furnace longitudinally, axially aligned with reference to the distributor, and a plurality of flues symmetrically disposed about the axis of the distributor communicating with the furnace and terminating about the distributor to deliver combustion products adjacent thereto and substantially parallel to the axis thereof.

2. In an apparatus for delivering heated gases for contact with a liquid spray, the combination of a spray distributor, a combustion furnace longitudinally, axially aligned with reference to the distributor, a movable valve adapted to control the flow of combustion products from the furnace and a plurality of flues symmetrically disposed about the axis of the distributor communicating with the furnace and terminating about the distributor to deliver combustion products adjacent thereto and substantially parallel to the axis thereof.

3. In an apparatus for delivering heated gases for contact with a liquid spray, the combination of a spray distributor, a combustion furnace longitudinally, axially aligned with reference to the distributor, and a plurality of flues symmetrically disposed about the axis of the distributor communicating with the furnace and terminating about the distributor to deliver combustion products adjacent thereto and substantially parallel to the axis thereof, the flues having partitions therein to subdivide the streams of combustion products.

OLIVER T. PIEPER.

REFERENCES CITED

The following references are of record in the file of this patent:

UNITED STATES PATENTS

| Number | Name | Date |
|---|---|---|
| 954,451 | Merrell | Apr. 12, 1910 |
| 1,779,296 | Spross | Oct. 21, 1930 |
| 1,966,084 | Werner | July 10, 1934 |
| 2,280,073 | Hall | Apr. 21, 1942 |
| 2,375,288 | Dennis | May 8, 1945 |